(12) United States Patent
Ward

(10) Patent No.: US 9,371,201 B2
(45) Date of Patent: Jun. 21, 2016

(54) CONTAINER LOADER

(75) Inventor: Simon Robert Ward, Hamilton (NZ)

(73) Assignee: A Ward Attachments Limited, Auckland (NZ)

( * ) Notice: Subject to any disclaimer, the term of this patent is extended or adjusted under 35 U.S.C. 154(b) by 0 days.

(21) Appl. No.: 14/000,001

(22) PCT Filed: Feb. 17, 2012

(86) PCT No.: PCT/NZ2012/000016
§ 371 (c)(1),
(2), (4) Date: Oct. 10, 2013

(87) PCT Pub. No.: WO2012/112058
PCT Pub. Date: Aug. 23, 2012

(65) Prior Publication Data
US 2014/0037408 A1    Feb. 6, 2014

(30) Foreign Application Priority Data
Feb. 17, 2011   (AU) ............................... 2011900529

(51) Int. Cl.
*B65G 67/00*   (2006.01)
*B65G 67/22*   (2006.01)
*B65G 67/20*   (2006.01)

(52) U.S. Cl.
CPC ............. *B65G 67/22* (2013.01); *B65G 67/20* (2013.01)

(58) Field of Classification Search
CPC ...... B65G 67/20; B65G 67/22; B65G 63/025; B65F 9/00; B65F 3/28; B65F 3/201; B60P 1/6427; B60P 1/006; B60P 1/6436; B65D 88/54

USPC .......................... 414/400, 352, 349, 809, 338
See application file for complete search history.

(56) References Cited

U.S. PATENT DOCUMENTS

| 2,298,982 | A |   | 10/1942 | Smith |
| 2,665,942 | A | * | 1/1954 | Bowen ...................... 239/214.25 |
| 3,235,211 | A | * | 2/1966 | Bradfield, Jr. et al. .......... 410/61 |
| 4,537,554 | A |   | 8/1985 | Collins, Jr. |
| 5,009,564 | A |   | 4/1991 | Lutz et al. |
| 5,106,247 | A | * | 4/1992 | Hove et al. ...................... 410/73 |

(Continued)

FOREIGN PATENT DOCUMENTS

| WO | 2007/149443 A2 | 12/2007 |
| WO | 2009/019449 A1 | 2/2009 |

*Primary Examiner* — Saul Rodriguez
*Assistant Examiner* — Mark Hageman
(74) *Attorney, Agent, or Firm* — Seed IP Law Group PLLC

(57) ABSTRACT

The invention is directed to a material loader for quickly and easily loading material, particularly bulk material, into a containment apparatus. Material to be loaded is placed inside a bin that is dimensioned to fit inside the containment apparatus. In use the containment apparatus is positioned so that the bin is inside the containment apparatus and the containment apparatus or a vehicle bearing the containment apparatus is connected to a material transfer member inside the bin. Forward movement of the containment apparatus/vehicle causes the material transfer member to hold against the material while the bin slides out of the containment apparatus from the point of view of the containment apparatus, leaving the material behind. In other words, the forward movement of the containment apparatus/vehicle causes the material transfer member to pull the material into the containment apparatus. The invention may also be used for unloading a containment apparatus.

14 Claims, 15 Drawing Sheets

(56) References Cited

U.S. PATENT DOCUMENTS

| | | |
|---|---|---|
| 5,193,453 A | 3/1993 | Lundy |
| 5,314,290 A * | 5/1994 | Lutz et al. .................. 414/509 |
| 6,427,585 B1 * | 8/2002 | Brown et al. ................. 100/41 |
| 6,652,214 B1 * | 11/2003 | Barry ........................... 414/337 |
| 7,172,382 B2 | 2/2007 | Frankel |
| 7,588,406 B2 | 9/2009 | Frankel |
| 7,699,575 B2 * | 4/2010 | Frankel ........................ 414/395 |
| 7,744,330 B2 * | 6/2010 | Haub et al. ............... 414/416.03 |
| 7,837,428 B2 | 11/2010 | Adams et al. |
| 2012/0107075 A1 * | 5/2012 | Uhrick et al. ................ 414/400 |

* cited by examiner

CONTAINER LOADER

FIELD OF INVENTION

The invention relates to a material loader. More particularly, the invention relates to an improved apparatus and method for loading material into a shipping container and the like.

BACKGROUND TO THE INVENTION

Containers are used to transport a vast range of materials and goods all around the world. Quick and efficient loading and unloading of containers is desirable as this translates into cost savings and increased profits for companies in the transportation and freighting business. One way efficiencies have been improved is through the standardisation of container sizes, which has reduced the costs associated with transporters and freight equipment since there are fewer different container sizes. Despite these improvements, there are still a number of different standards which must be catered for when providing container loading equipment, which increases costs.

A number of ways of speeding up the loading of a container have been used. Pallets are convenient for materials of certain sizes and dimensions, but typically they are not suitable for bulk material, such as scrap metal, because the pieces of bulk material may be too large for a pallet or the use of pallets may lead to the underutilisation of space within the container. As a result, bulk material is usually loaded loosely into a container. Recent developments in bulk material loading devices include the Acculoader by Body Equipment, Inc and the Scrapper™ produced by Steco. These devices comprise bins that can fit inside a container and are mounted on a sliding mechanism for sliding forwards and backwards in and out of the container. The bins are top-loaded with bulk material and a hydraulic ram is used to push the material from the bin into the container.

An example of a similar such device is disclosed in U.S. Pat. No. 7,837,428 in the name of SA Recycling LLC. In this invention, a bin is top-loaded with material to be loaded into a container. The container is backed up to the bin so the bin fits within the container. A ram is then used to push the material from the bin into the container. The truck carrying the container needs to edge forwards at a similar speed as the speed of the hydraulic ram so that the bulk material load is distributed through the container.

Container loaders such as have been described are typically very large pieces of equipment that have a large footprint and are not very mobile. For example, the loader disclosed in U.S. Pat. No. 7,837,428 has a footprint of approximately twice the length of a container because of the need to cantilever the loaded bin to prevent tipping. It would be advantageous to provide a loader with as small a footprint as possible to save space in loading yards.

The type of loader discussed above also requires a hydraulic ram sufficiently powerful to drive a large quantity of material forwards from the bin into the container, overcoming the friction of the material with the bottom of the bin. A ram that can provide this significant amount of force is costly, expensive to run and maintain, and occupies valuable space.

The loader in U.S. Pat. No. 7,837,428 also requires the truck carrying the container to move forwards at a speed similar to that at which the hydraulic ram moves forward. This may be difficult to achieve in practice.

OBJECT OF THE INVENTION

It is an object of the invention to provide an improved material loader.

Alternatively, it is an object to provide an improved method of loading material into a containment apparatus, such as a freight container.

Alternatively, it is an object to address at least some of the foregoing disadvantage(s) associated with the prior art.

Alternatively, it is an object of the invention to at least provide the public with a useful choice.

SUMMARY OF THE INVENTION

In general non-limiting terms, the invention is directed to a material loader for quickly and easily loading material, particularly bulk material, into a containment apparatus. Material to be loaded is placed inside a bin that is dimensioned to fit inside the containment apparatus. In use, the containment apparatus is positioned so that the bin is inside the containment apparatus and the containment apparatus or a vehicle bearing the containment apparatus is connected to a material transfer member inside the bin. Forward movement of the containment apparatus/vehicle causes the material transfer member to hold against the material while the bin slides out of the containment apparatus from the point of view of the containment apparatus, leaving the material behind. In other words, the forward movement of the containment apparatus/vehicle causes the material transfer member to pull the material into the containment apparatus. The invention may also be used for unloading a containment apparatus.

The invention is particularly applicable to loading and unloading freight containers, sometimes referred to as intermodal or ISO containers. However, it is not limited as such and the invention may be used to load or unload any kind of container or containment apparatus. For example, in some embodiments the invention is used to load a transport trailer, semi-trailer truck or the like. The term "container" when used herein will be understood to mean any device capable of containing material.

According to a first aspect of the invention, there is provided a material loader comprising:
  a bin having an open or openable first end adapted to fit inside a containment apparatus;
  a material transfer member having a part thereof operable to move along the inside of the bin towards the first end; and
  attachment means adapted to attach the material transfer member to a pulling means for pulling the material transfer member towards the first end.

Preferably, the attachment means is adapted to attach the material transfer member to the containment apparatus and/or a vehicle bearing the containment apparatus.

Preferably, the pulling means comprises the vehicle bearing the containment apparatus and wherein forward movement of the vehicle relative to the bin causes the material transfer member to move towards the first end.

In use, the bin is at least partially filled with material intended to be loaded into the containment apparatus. Forward movement of the containment apparatus and/or vehicle relative to the bin causes the material transfer member to transfer the material in the bin into the containment apparatus. As a result, the containment apparatus and/or vehicle effectively pulls the material in the bin into the containment apparatus.

Preferably, the material transfer member comprises a substantially flat plate. More preferably, the shape of the plate is complementary to the shape of the inside of the bin such that there is minimal space between the edges of the plate and the inside of the bin.

Preferably, the material transfer member further comprises a rig connected to a top portion of the plate, the rig being operable to move along outside the bin.

Preferably, the rig comprises substantially vertical and horizontal support portions.

Preferably, the material transfer member comprises reinforcement means for withstanding reaction forces acting thereon.

Preferably, the bin has an at least partially open top suitable for allowing material to be loaded into the bin.

Preferably, the material loader comprises a bin door or doors at the first end of the bin.

Preferably, the material loader further comprises a door(s) actuation mechanism adapted to close the bin door(s) following loading of the containment apparatus.

Preferably, the material loader comprises support means for supporting the material loader on the ground. More preferably, the support means support the bin at a height above ground level proximate to the height of a containment apparatus when mounted on a vehicle.

Preferably, the material loader comprises orientation adjustment means. More preferably, the orientation adjustment means comprises one or more hydraulic pistons operable to tilt and/or move the bin in at least one direction. In a preferred embodiment, the hydraulic pistons are connected to a second end of the bin, the second end being opposite to the first end.

Preferably, the material loader comprises foldable support means on the outside of the bin. More preferably, the foldable support means is adapted to fold up against the underside of the bin such that the containment apparatus is able to move relative to the bin to contain a greater part of the bin therein. When folded, the containment apparatus and/or vehicle support(s) at least a part of the weight of the bin and material therein.

In one embodiment of the invention, the foldable support means comprises one or more legs, each leg comprising two struts and a foot member, each strut being pivotably attached at a first end to the foot member and pivotably attached at a second end to the underside of the bin, wherein one of the struts is pivotably attached to the underside of the bin by means of a sliding portion in sliding engagement with the underside of the bin.

In one embodiment, the bin door(s) is/are only able to close if the foldable support means is not in a folded configuration.

Preferably, the material loader comprises rolling means on an underside of the bin for assisting movement of the bin inside the containment apparatus.

In a preferred embodiment of the invention, the attachment means comprises trigger means for attaching the material transfer member to the containment apparatus and/or a vehicle when the containment apparatus and/or vehicle triggers the trigger means.

Preferably, the attachment means comprises a fastening arm pivotably connected to the material transfer member.

The trigger means may comprise an extending member which is configured to be pushed upon correct positioning of the containment apparatus with respect to the material loader, the extending member when pushed allowing the fastening arm to pivot into engagement with the containment apparatus and/or vehicle.

Preferably, the material loader further comprises release means adapted to release the attachment means when the material transfer member reaches a point proximate the first end of the bin. More preferably, the release means comprises a projection on one or both sides of the bin that, when the attachment means passes over the projection, releases the attachment means. For example, the projection pushes the fastening arm out of engagement with the containment apparatus and/or vehicle.

Preferably, the release means is configured to only release the attachment means when the foldable support means is not in a folded configuration.

Embodiments of the invention may be provided in which the material loader comprises actuation means for moving the material transfer member along the inside of the bin towards the first end. Said actuation means may assist the containment apparatus and/or vehicle in moving the material transfer member.

Preferably, the actuation means for moving the material transfer member comprises at least one cable connected between the material transfer member and an actuator such that, when actuated, the actuator pulls the material transfer member by means of the cable. More preferably, the actuation means comprises one or more pulleys about which the cable passes.

Preferably, the actuation means comprises a tensioning means to hold the cable in tension during operation.

In one embodiment of the invention, the material loader comprises a material compactor apparatus for compacting the material prior to being loaded in the bin. The material transfer member may be able to be moved to allow the compacted material to be moved from the compactor into the bin. For example, the material transfer member may be able to be lifted out of the bin. The material compactor may comprise an extendable compactor ram for compacting material in the compactor, said compactor ram being further extendable to move the compacted material from the compactor into the bin.

It will be appreciated that a material loader according to the invention may be adapted to load any type of containment apparatus able to fit the bin inside it. However, it is particularly envisaged that it is to be used for loading a freight or shipping container such as is typically used for transporting large volumes of material. The material loader may also be used for loading material into transport tub, bathtub and Gondola trailers. Any material may be loaded into the container and the invention is not limited thereby.

According to a second aspect of the invention, there is provided a method of loading a containment apparatus comprising:

positioning the containment apparatus such that at least the first end of a fully or partially loaded bin is inside the containment apparatus;

connecting a material transfer member having a part thereof operable to move along the inside of the bin towards the first end to a pulling means for pulling the material transfer member towards the first end; and pulling the material transfer member towards the first end of the bin and thereby transferring material from the bin into the containment apparatus.

Preferably, connecting the material transfer member to a pulling means comprises connecting the material transfer member to the containment apparatus and/or a vehicle bearing the containment apparatus.

Preferably, pulling the material transfer member comprises driving the vehicle bearing the containment apparatus forward in a direction away from the bin. As a result, the vehicle effectively pulls the material in the bin into the containment apparatus.

Preferably, the method comprises the step of loading material into the bin. In one embodiment, loading material into the bin comprises loading material into the top of the bin.

In an alternative embodiment, loading material into the bin comprises transferring material from a material compactor apparatus into the bin, for example by pushing the material into the bin with a compactor ram. In this alternative embodiment, the method may further comprise compacting the material in the compactor prior to loading material into the bin.

Preferably, positioning the containment apparatus comprises moving the containment apparatus to engulf at least a part of the bin.

Preferably, upon moving the containment apparatus to engulf at least a part of the bin a foldable support means connected to an underside of the bin causes the foldable support means to fold such that the containment apparatus and/or vehicle bears the weight of the bin and any material therein.

Preferably, the method further comprises loading material into a bin having an open or openable first end.

In one embodiment, the method further comprises actuating an actuation means for pulling the material transfer member along the inside of the bin towards the first end. Said actuation means may assist the containment apparatus and/or vehicle in moving the material transfer member.

More preferably the step of actuating an actuation means comprises pulling the material transfer member by means of a cable. The method may further comprise keeping the cable under tension.

According to a third aspect of the invention, there is provided a material loader comprising:
- a bin having an open or openable first end adapted to fit inside a containment apparatus;
- a material transfer member having a part thereof operable to move along the inside of the bin towards the first end; and
- foldable support means on an underside of the bin adapted to support at least part of the weight of the material loader in an unfolded configuration and adapted to allow movement of the containment apparatus relative to the bin in a folded configuration.

Preferably, the foldable support means comprises one or more legs, each leg comprising two struts and a foot member, each strut being pivotably attached at a first end to the foot member and pivotably attached at a second end to the underside of the bin, wherein one of the struts is pivotably attached to the underside of the bin by means of a sliding portion in sliding engagement with the underside of the bin.

Preferably, the material loader comprises means for automatically folding and unfolding the foldable support means depending on the position of the containment apparatus.

Preferably, the material loader comprises:
- attachment means adapted to operably attach the material transfer member to the containment apparatus and/or a vehicle bearing the containment apparatus; and
- release means adapted to release the attachment means when the material transfer member reaches a point proximate the first end of the bin,
- wherein the release means is configured to only release the attachment means when the foldable support means is not in a folded configuration.

According to a fourth aspect of the invention, there is provided a material unloader comprising:
- a bin having an open or openable first end;
- a material transfer member having a part thereof operable to move along the inside of the bin towards the first end; and
- attachment means adapted to operably attach the material transfer member to a device operable to pull the material transfer member towards the first end.

According to a fifth aspect of the invention, there is provided a method for unloading a containment apparatus comprising:
- connecting a material transfer member to a pulling means, the material transfer member having a part thereof operable to move along the inside of the containment apparatus towards an open end of the containment apparatus; and
- pulling the material transfer member along the inside of the containment apparatus with the pulling means, thereby causing the material transfer member to transfer material out of the containment apparatus.

According to a sixth aspect of the invention, there is provided a container loader comprising:
- a bin having an open or openable first end adapted to fit inside a container;
- a material transfer member having a part thereof operable to move along the inside of the bin towards the first end; and
- attachment means adapted to operably attach the material transfer member to the container and/or a vehicle bearing the container.

According to a seventh aspect of the invention, there is provided a method of loading a container comprising:
- positioning a container such that at least the first end of a fully or partially loaded bin is inside the container;
- connecting the container and/or a vehicle bearing the container to a material transfer member having a part thereof operable to move along the inside of the bin towards the first end; and
- moving the container away from the bin thereby causing the material transfer member to move along the inside of the bin and transfer material from the bin into the container.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

One or more embodiments of the invention will be described below by way of example only, and without intending to be limiting, with reference to the following drawings, in which.

DETAILED DESCRIPTION OF PREFERRED EMBODIMENTS OF THE INVENTION

Figure 1:
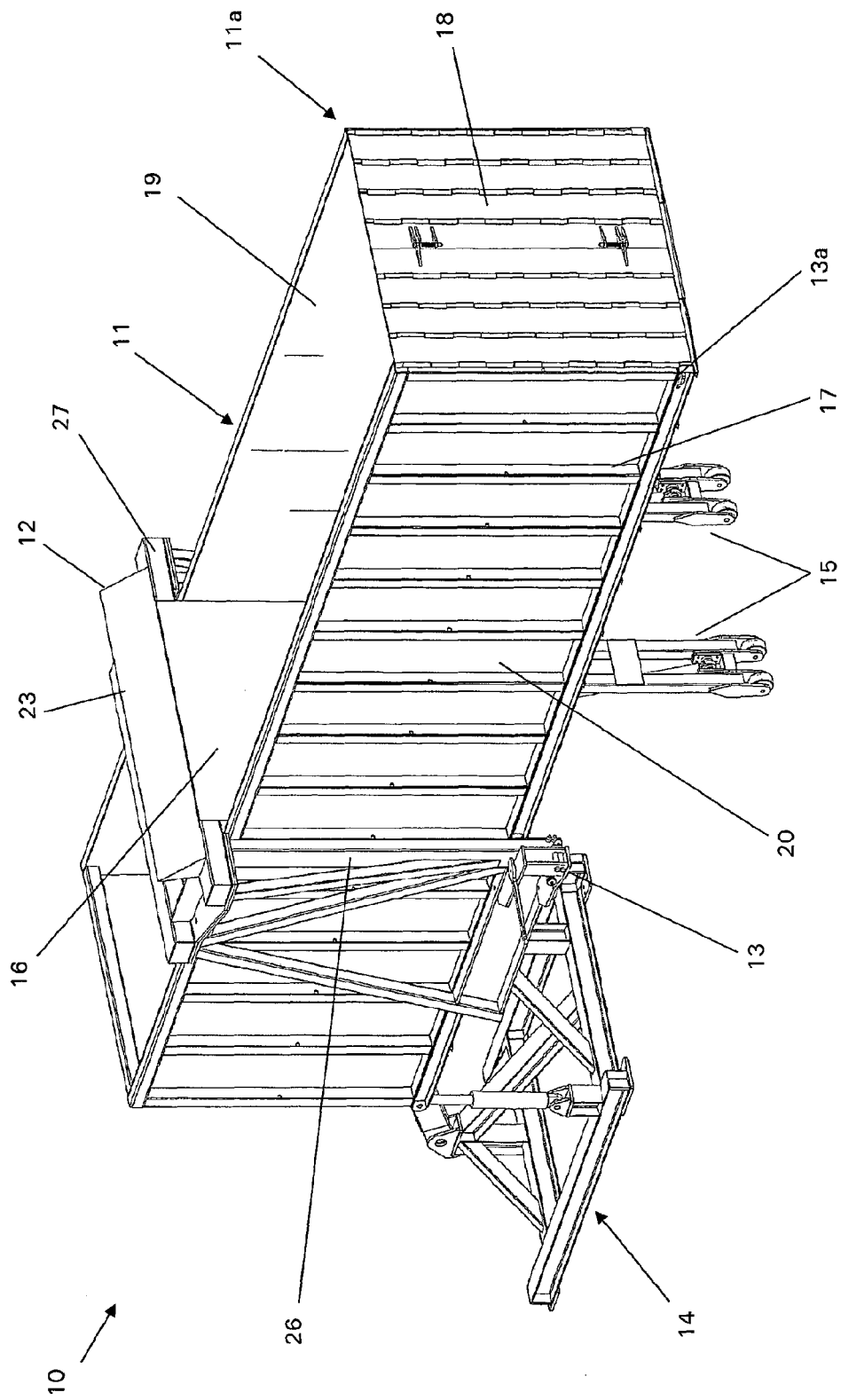
FIG. 1 is a front perspective view illustration of a container loader according to an embodiment of the invention.

The invention generally relates to a material loader for loading material into a containment apparatus. As specified above, the containment apparatus may comprise any apparatus capable of holding or containing material including freight containers and open-top trailer beds. In the following description, the invention will be described, by way of example only, in relation to a material loader for loading material into a freight container.

FIGS. 1-4 are different perspective view illustrations of a container loader 10 according to an embodiment of the invention. Container loader 10 comprises a bin 11, material transfer member 12, which may include vertical plate 16, attachment means 13 and support means 14 and 15.

Bin 11 is any receptacle capable of holding material. Bin 11 is generally cuboid in shape and has a first end 11a capable of fitting inside a container, for example a shipping container. In a preferred embodiment bin 11 has a cross-section complementary to, and slightly smaller than, a standard shipping container. In the embodiment shown, most of the length of bin 11 is able to fit inside a container.

Bin 11 has an at least partially open top for allowing material to be loaded into and unloaded from bin 11.

Walls 19 and 20 of bin 11 are, in the embodiment shown in FIGS. 1-4, continuous (i.e. there are no gaps in the walls) so that even very granular forms of material can be contained therein. The inner side of walls 19 and 20 is sufficiently smooth such that material can generally slide relative thereto without snagging. The outer side of walls 19 and 20 may comprise vertical struts 17 to reinforce their strength.

Figure 2:
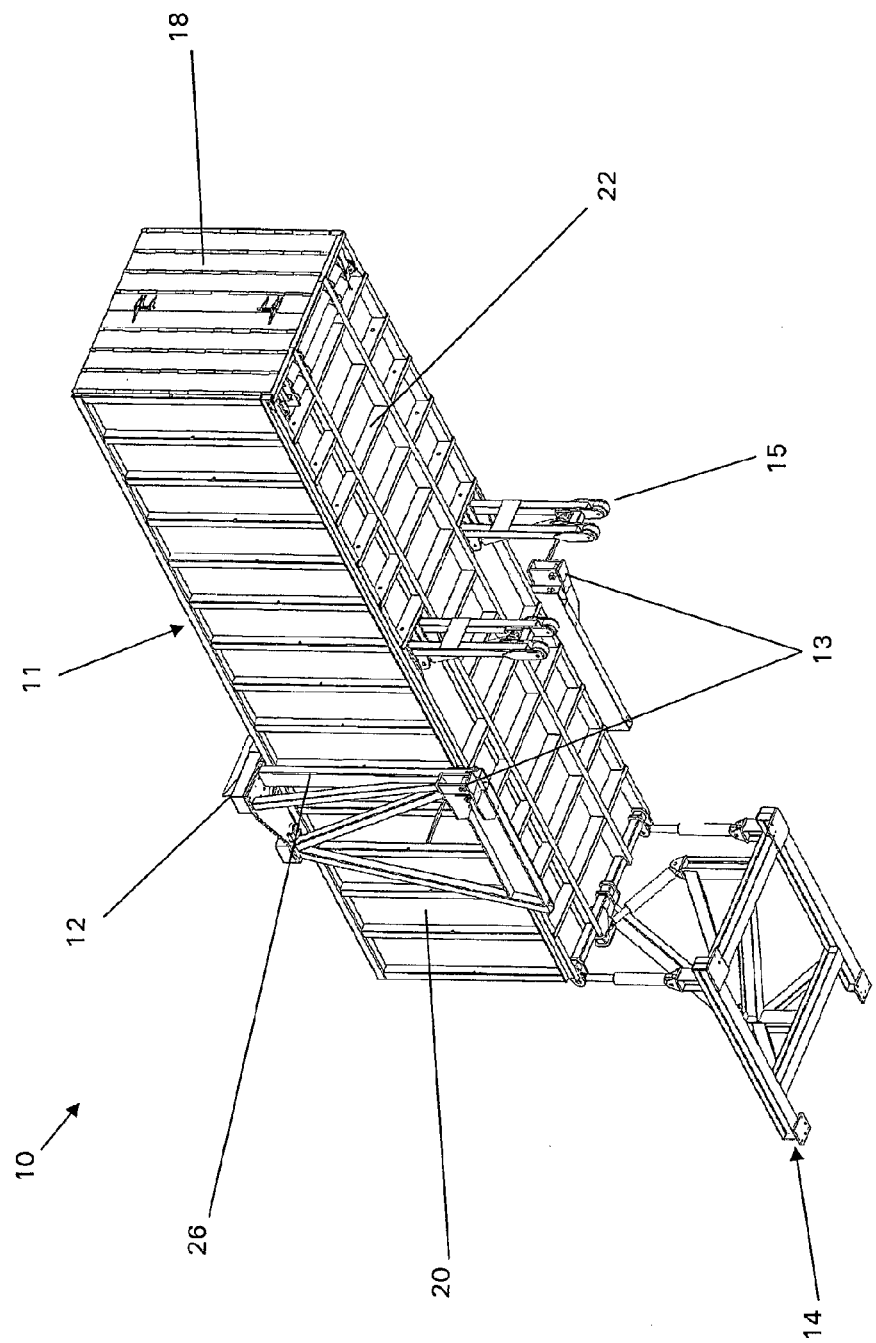
FIG. 2 is a bottom perspective view illustration of the container loader illustrated in FIG. 1.

The upper side of bottom of bin 11 is also sufficiently smooth for material to slide easily along the bottom of the bin. The lower side of bottom may comprise reinforcing struts 22 such as are shown in FIG. 2.

First end 11a of bin 11 is open or openable. For example, in FIG. 1 bin 11 comprises doors 18 at first end 11a. Bin doors 18 may be closed for the purposes of loading or unloading bin 11 but opened for the purposes of moving material out of bin 11 and into a container. In the embodiment shown, bin doors 18 comprises a series of vertical portions such that the doors can be closed gradually as material is ejected from bin 11.

Container loader 10 further comprises material transfer member 12. In the embodiment shown, material transfer member 12 comprises a vertical plate 16, a top portion of which is connected to rig 23. The front face of plate 16 is substantially flat. The back face of plate 16 may be reinforced with vertical struts if required. Material transfer member 12 is operable to move along the length of bin 11 such that plate 16 moves along the inside of bin 11 and transfers any material in the bin in front of it towards first end 11a.

The shape of plate 16 is preferably complementary to the cross-sectional shape of the inside of bin 11 such that there is minimal space between the edges of the plate and the inside of the bin. This ensures that minimal material contained in bin 11 can slip past the plate and so substantially all the material is transferred out of bin 11 upon actuation of the plate. In the embodiment shown, bin 11 comprises angled portions at the bottom of its side walls, as can be seen more clearly in FIGS. 3 and 4. As such, plate 16 comprises complementarily angled lower corners.

Rig 23 comprises substantially vertical support portions 26 on either side of bin 11 and a substantially horizontal crossbar support portion 27 between them to which plate 16 is connected. Rig 23 is mounted on bin 11 such that bin 11 generally supports its weight. For example, a portion of the vertical supports 26 may be adapted to slide along a groove in the outer side of walls 19 and 20 and/or horizontal crossbar 27 may slide along the top of side walls 19 and 20.

In use, material transfer member 12 is used to transfer material along bin 11 and therefore plate 16 is subject to significant reaction forces. Material transfer member 12, which includes plate 16, needs to have sufficient strength to withstand such forces. Therefore, material transfer member may comprise reinforcement means.

Figure 3:
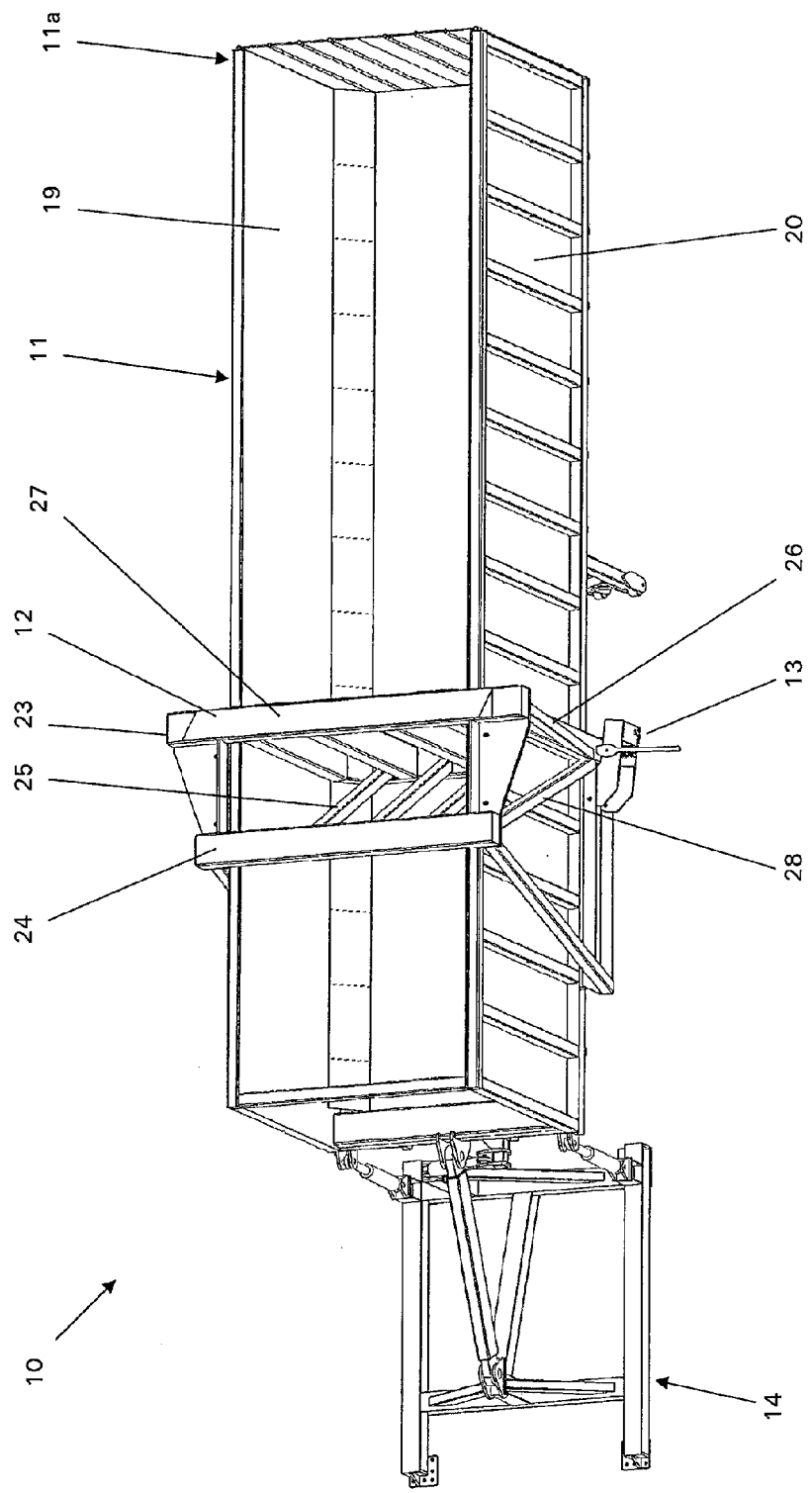
FIG. 3 is a top perspective view illustration of the container loader illustrated in FIGS. 1 and 2.

An example of such a reinforcement means is shown in FIG. 3. The reinforcement means illustrated in FIG. 3 comprises a crossbar 24 and at least one cross-brace 25. Cross-braces 25 are connected to crossbar 24 and a lower portion of plate 16. Crossbar 24 is also preferably connected to substantially vertical supports 26 by further braces 28 positioned outside bin 11. Further reinforcing components may be provided as will be apparent to those of skill in the art such that material transfer member 12 has sufficient strength for its purpose as described above.

Container loader 10 further comprises attachment means 13 for operably attaching the material transfer member 12 to a pulling means for pulling the material transfer member towards the first end of the bin. In one embodiment, the pulling means comprises a container to be loaded and/or a vehicle bearing the container. When the material transfer member is operably attached to the container and/or vehicle, the material transfer member is able to be moved along bin 11 by movement of the container/vehicle. The material transfer member 12 is thus pulled by the container/vehicle.

In the embodiment of the invention shown in FIGS. 1-4, attachment means 13 comprises fastening arms positioned proximate the bottom of vertical supports 26. The fastening arms are adapted to fasten to a side of a container such that, when fastened, material transfer member 12 is held in a substantially fixed position relative to the container. An exemplary attachment means is described further below in relation to FIGS. 7 and 8.

Container loader 10 further comprises support means 14 and 15 for supporting the container loader on the ground. In the embodiment shown, the support means are adapted to hold bin 11 at a height comparable to the height of a container when mounted on a vehicle such that a vehicle can back a container over bin 11 without significant adjustment in the height of the bin.

Figure 4:
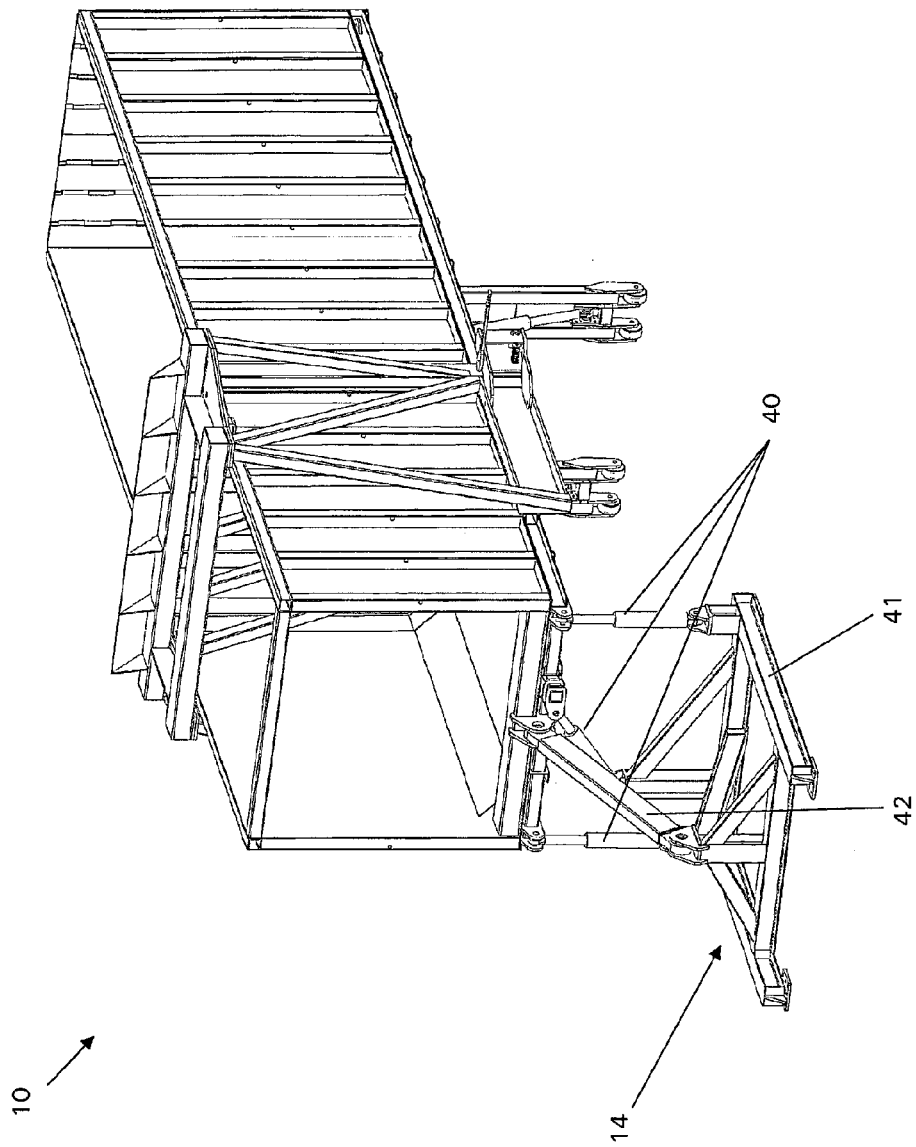
FIG. 4 is a rear perspective view illustration of the container loader illustrated in FIGS. 1-3.

FIG. 4 illustrates rear support means 14 in more detail. Rear support means 14 comprises orientation adjustment means for adjusting the orientation of bin 11 connected to the bottom of a second end of bin 11 opposite first end 11a. For example, in FIG. 4, rear support means 14 comprises hydraulic pistons 40 mounted on framing 41, the pistons being connected to the rear bottom edge of bin 11. A pivot bar 42 further connecting bin 11 to framing 41 may also be provided.

It will be appreciated by those of skill in the art how the orientation of bin 11 may be adjusted using hydraulic pistons

40. For example, the pistons are selectively operable to alter the height of the back of bin 11 and therefore its degree of tilt. The pistons also allow the bin to lean from side to side and to rotate horizontally.

Rear support means 14 may be advantageously fixed to the ground in the desired location for container loader 10. This prevents the loader moving during transfer of material into a container. It also prevents the loader from tipping over should a large amount of material be loaded into the bin proximate the doors.

In the embodiment shown in FIGS. 1-4, support means 15 comprises two legs attached to the underside of bin 11, at the bottom of which are mounted roller means in the form of wheels. Support means 15 are shown in FIGS. 1-4 in an unfolded configuration in which they are adapted to support at least part of the weight of the container loader. Support means 15 are able to fold up against the underside of bin 11 into a folded configuration in which they are adapted to allow movement of the container relative to the bin, as will be explained in more detail below. The legs of support means 15 are preferably positioned proximate the middle of bin 11. This has been found to allow good control of the pivotal motion of bin 11 when pistons 40 are operated to pivot bin 11 in the horizontal plane, which may be necessary to align the bin with a container.

Any suitable material(s) may be used to construct a container loader according to the invention and the invention is not limited to any particular material(s). However, in a preferred embodiment, the container loader is principally constructed from steel because of the strength and durability of steel. The inner surfaces of the bin and the front of the plate may be abrasion plated to increase the wear of these surfaces that will be regularly in sliding contact with different materials. For example, these contact surfaces may be plated with tempered steel.

Operation of the Invention

Figure 5:
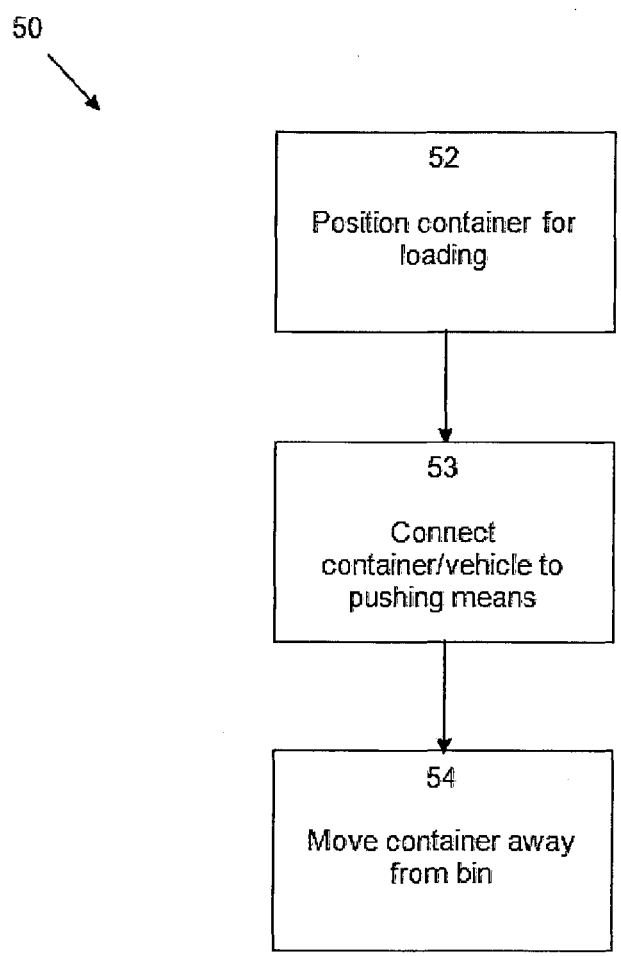
FIG. 5 is a flow chart illustrating a method of loading a container according to an embodiment of the invention.

The operation of the container loader when used to load material into a container according to the embodiment shown in FIGS. 1-4 will now be described with reference to FIG. 5, which is a flow chart illustrating a method 50 of loading a container according to an embodiment of the invention.

At step 52, the container to be loaded is positioned for loading in relation to a loaded or partially loaded bin. For the purposes of the following discussion of the method of loading, it will be assumed that the container is mounted on a vehicle, for example a truck or lorry. However, such an arrangement is not limiting to the invention. For example, the container may be hanging from a crane or in any other arrangement such that it is moveable in relation to the container loader.

Either the bin is already loaded or partially loaded or, as a preliminary step, material may be loaded into bin 11. Material may be loaded by any suitable method but it is envisaged that material will be preferably loaded into the top of bin 11, for example using a grapple, claw, crane, digger or the like. The front doors 18 of bin 11 are preferably closed during this step to assist in containing the material within the bin.

Material transfer member 12 is preferably positioned before loading at a suitable position such that the volume of bin 11 between plate 16 and doors 18 corresponds approximately to the volume of material to be loaded into the container. Plate 16 can be moved backwards or forwards to alter the volume of bin 11 capable of receiving material to be loaded.

In one example of positioning the container at step 52, the vehicle bearing the container reverses in the direction of bin 11. As it reverses, bin 11 is aligned with the container. If necessary, the orientation adjustment means of the container loader can be operated to adjust the height and/or orientation of bin 11 such that it is aligned with the reversing container. Alignment assistance may be provided to the driver of the vehicle, for example in the form of wheel guides on the ground to ensure the vehicle reverses towards the container loader in the desired direction, thus minimising the risk of an impact between the container or vehicle and the loader, which could cause damage to any of these. The vehicle continues reversing such that the container engulfs at least end 11a of the bin, which is then positioned inside the container.

When the container has reversed along bin 11 such that it contacts foldable support means 15, it pushes against the legs of support means 15, causing them to fold up onto the underside of bin 11. As support means 15 are folded up, they are no longer in contact with the ground and therefore no longer support part of the weight of bin 11. Instead, the container and vehicle support at least part of the weight of bin 11.

As well as aiding movement of the container loader, the wheels at the bottom of support means 15 may also help the container slide relative to the bottom of bin 11.

The container continues reversing until it is approximately adjacent to material transfer member 12. At step 53, the container and/or vehicle bearing the container is/are connected to material transfer member 12 via attachment means 13. In the embodiment shown, the fastening arm is attached to the outside of the container such that the container and material transfer member are moveably fixed together. The fastening arm may attach to the container automatically as will be described in relation to FIGS. 7 and 8.

Before the next step, doors 18 of container loader 10 are opened if they were not previously open.

At step 54, the container is moved away from bin 11. In the example presently described, the vehicle bearing the container drives forward. Because the container is attached to material transfer member 12, as the vehicle drives forward the material transfer member is caused to move in the same direction along the inside of bin 11. It therefore transfers material along bin 11. When material reaches end 11a of the bin, the material is transferred from the bin into the container and a greater proportion of the bin emerges out of the container. In effect, the vehicle bearing the container pulls the material from the bin into the container.

As the container continues to move forward, more and more of the material in bin 11 is transferred into the container. The material drops into the container from a height corresponding to the height of the bottom of bin 11 above the bottom of the inside of the container, which is typically a small height. Furthermore, material is transferred into the container substantially without any material sliding along its bottom. This means that the inside of a container used with the loader is subject to only little impact or abrasion, which is advantageous as containers can be easily damaged.

Once the container moves forward past the foldable legs 15, the legs are free to fold down into the support position, ready to support the bin of the container loader when the container and vehicle are no longer positioned to do so.

Figure 6:
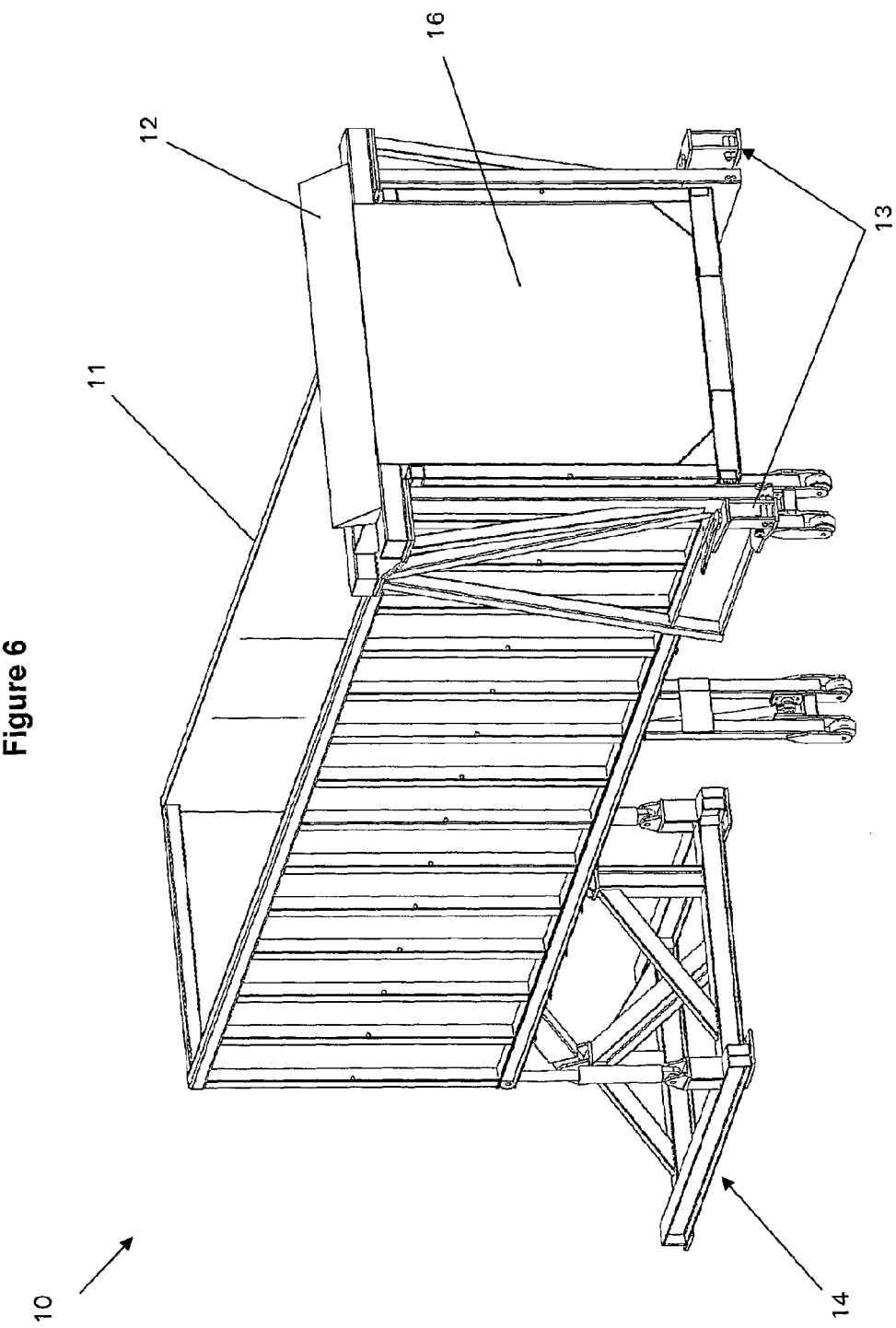
FIG. 6 is a perspective view illustration of the container loader illustrated in FIGS. 1-4.

The container is moved forward until material transfer member 12 reaches end 11a of bin 11. FIG. 6 is a perspective view illustration of container loader 10 when material transfer member 12 is at its most forward position (doors 18 are open in FIG. 6).

At this point, the bin is preferably disengaged from the connected container/vehicle using attachment means 13. As will be discussed in relation to the embodiment of FIGS. 7 and 8, the attachment mechanism may be adapted to automatically release the container when the material transfer member 12 is at its most forward position.

Once disengaged, the container is free to be moved forward and transported to its destination. The doors of the container may be closed once the material has been transferred into it, for example after the container has been disengaged from the container loader.

After the container has been disengaged from the material transfer member, the material transfer member is moved back into position ready for the bin to accept more material for loading. The container may comprise a winch or other suitable mechanism for moving the material transfer member back along the bin.

It will be appreciated that, in the example described above, the vehicle's power is used to manoeuvre the container into position and subsequently to pull the material transfer member forward in order to transfer material into the container. That is, in this embodiment all of the power required for transferring material from the container loader to the container may come from the vehicle. Container loaders according to some embodiments of the invention do not require any power source of their own to transfer material. However, in such embodiments, the container loader may be provided with a power source for alignment and bin support purposes only.

Exemplary Means for Attaching the Material Transfer Member to the Container

Figure 7:
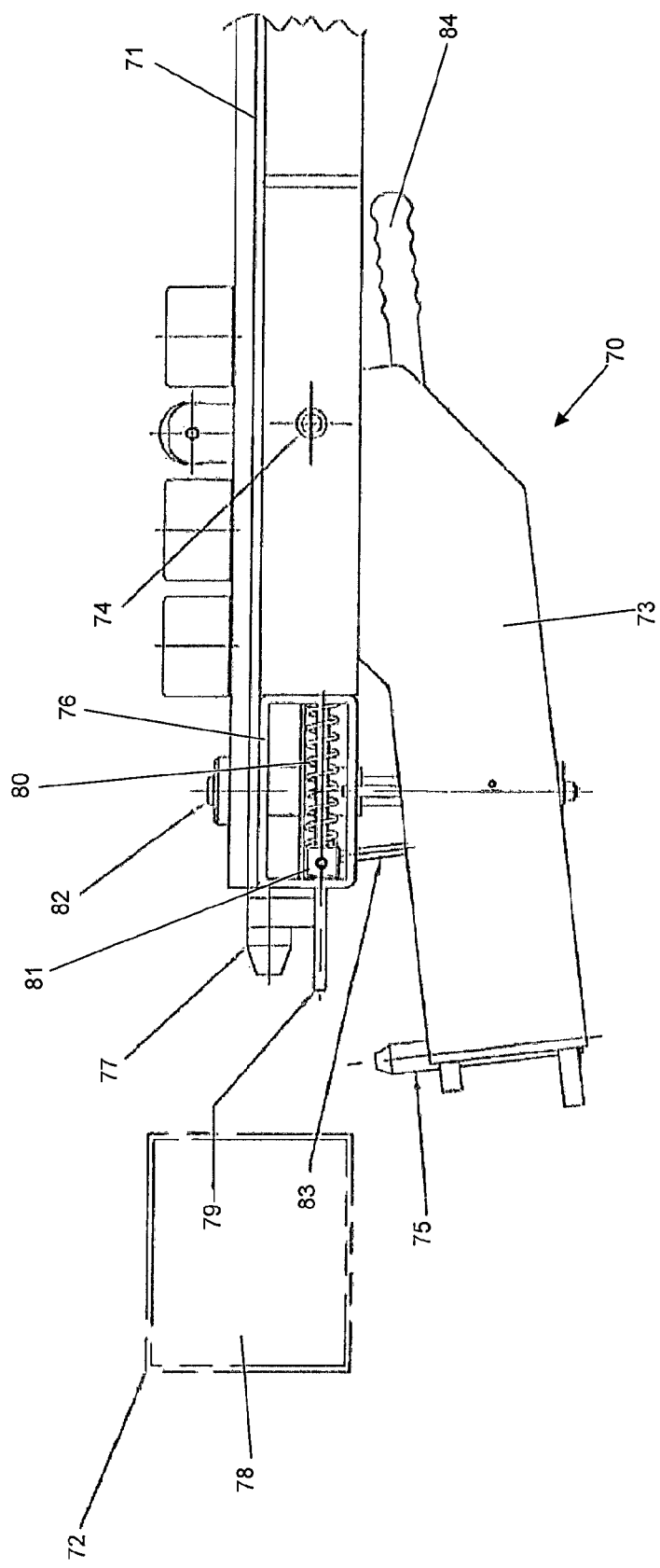
FIG. 7 is a plan view illustration of an attachment means for attaching a container loader to a container according to one embodiment of the invention.
Figure 8:
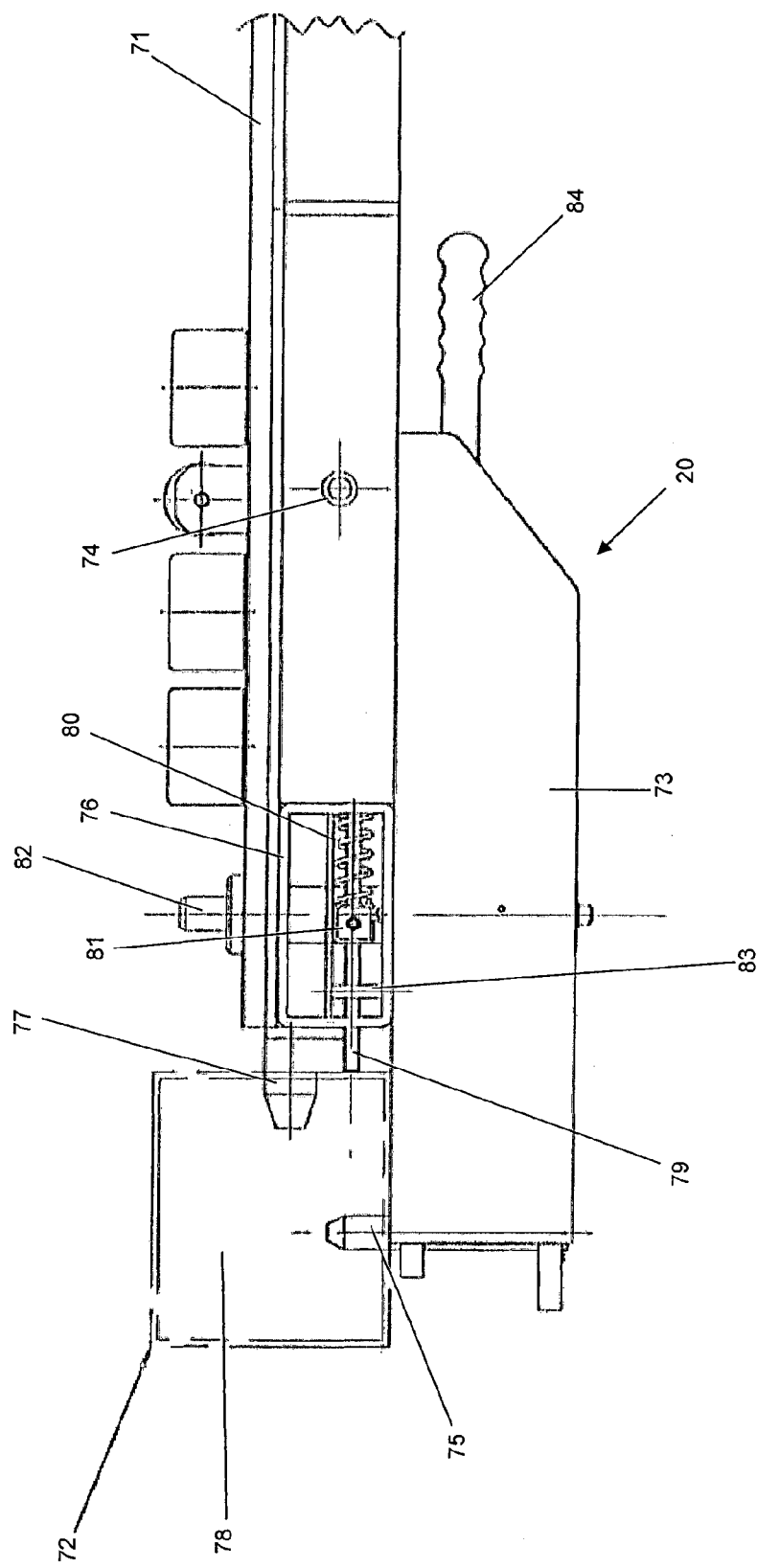
FIG. 8 is a further plan view illustration of the attachment means shown in FIG. 7.

FIGS. 7 and 8 are plan view illustrations of an attachment means 70 for attaching a container loader 71 to a container 72 according to one embodiment of the invention. Attachment means 70 is shown in the open position in FIG. 7 and in the closed position in FIG. 8.

The mechanism of attachment means or lock 70 will now be described. Lock 70 comprises a fastening arm 73 pivotably attached via pivot 74 to the rig of the material transfer member of the container loader. A locking pin 75 is positioned at the end of fastening arm 73. Lock 70 further comprises a guide pin 77, fixedly connected to the side of the rig. Locking pin 75 and guide pin 77 are configured to engage with a part of the container and/or vehicle to attach the material transfer member to the container and/or vehicle.

In the preferred embodiment shown, the locking and guide pins are suitably sized and positioned to engage with a corner casting block 78 of a standard freight container. In the locked position shown in FIG. 8, locking pin 75 is inserted into the side of casting block 78 and guide pin 77 is inserted into the end of the block. Corner casting blocks provide a strong and convenient place for attaching the material transfer member to the container.

In the embodiment shown in FIGS. 7 and 8, lock 70 comprises trigger means for attaching the material transfer member to the container when triggered by the container and/or vehicle, for example when the container is suitably positioned relative to the container loader.

The trigger means exemplified in FIGS. 7 and 8 will now be described. Attachment means or lock 70 further comprises a housing 76 attached to the side of the rig of the material transfer member. The guide pin 77 may project from the end of the housing. Passing through the end of housing 76 is trigger pin 79, which is longitudinally moveable within the housing and biased towards the extended position by spring 80. A boss 81 is provided on trigger pin 79, which causes spring 80 to contract when the trigger pin is pushed into housing 76. The boss also provides a surface for the spring to push against to cause the trigger pin to extend when the pin is released.

An actuator pin 82 is pivotably mounted to fastening arm 73 and passes through housing 76. In the open position, the end of actuator pin 82 on the inside of the material transfer member rig is substantially flush with the inner side of housing 76. In the locked positioned, the same end of actuator pin 82 extends a short way out of the housing. Actuator pin 82 is biased by a spring (not shown) inside fastening arm 73 towards the locked position.

Extending from the inside of fastening arm 73 is spacer pin 83. In the open position, spacer pin 83 is configured to abut against boss 81, thus preventing the spring on actuator pin 82 from locking the attachment mechanism.

In use, the container is backed into the container loader and the casting block is pushed up against lock 70, with guide pin 77 ensuring the proper alignment with the casting block. Casting block 78 pushes trigger pin 79 into housing 76, causing boss 81 to move back against spring 80 and release spacer pin 83. As a result, fastening arm 73 moves into the locked position and locking pin 75 is inserted into the side of casting block 78.

A mechanism to automatically release the lock when the container is loaded is also preferably provided. In the embodiment shown in the Figures, the release mechanism is actuated when the material transfer member reaches a point proximate the first end of the bin, corresponding to a time in the loading operation all of the material has been transferred from the bin to the container.

Release means may comprise a projection 13a such as can be seen in FIG. 1, which may be provided on one or both sides of the bin in line with the lock. In the case of the attachment or lock mechanism shown in FIGS. 7 and 8, when the mechanism passes over projection 13a, actuator pin 82 is pushed outwards, causing fastening arm 73 to move into the open position and locking pin 75 to move out of engagement with casting block 78. Therefore, the container is free to continue to move forwards and in doing so it releases trigger pin 79. This causes boss 81 to move back into position so that, when the material transfer mechanism is moved and projection 13a no longer pushes actuator pin 82 outwards, boss 81 blocks spacer pin 83, preventing the fastening arm from closing.

In some embodiments, the lock may further comprise a manual override mechanism by which the mechanism can be locked or opened manually. In the embodiment shown in FIGS. 7 and 8, lever arm 84 enables the lock to be manually moved between the locked and open configurations by the movement of lever arm 84.

Alternative Embodiments of the Invention

Figure 9:
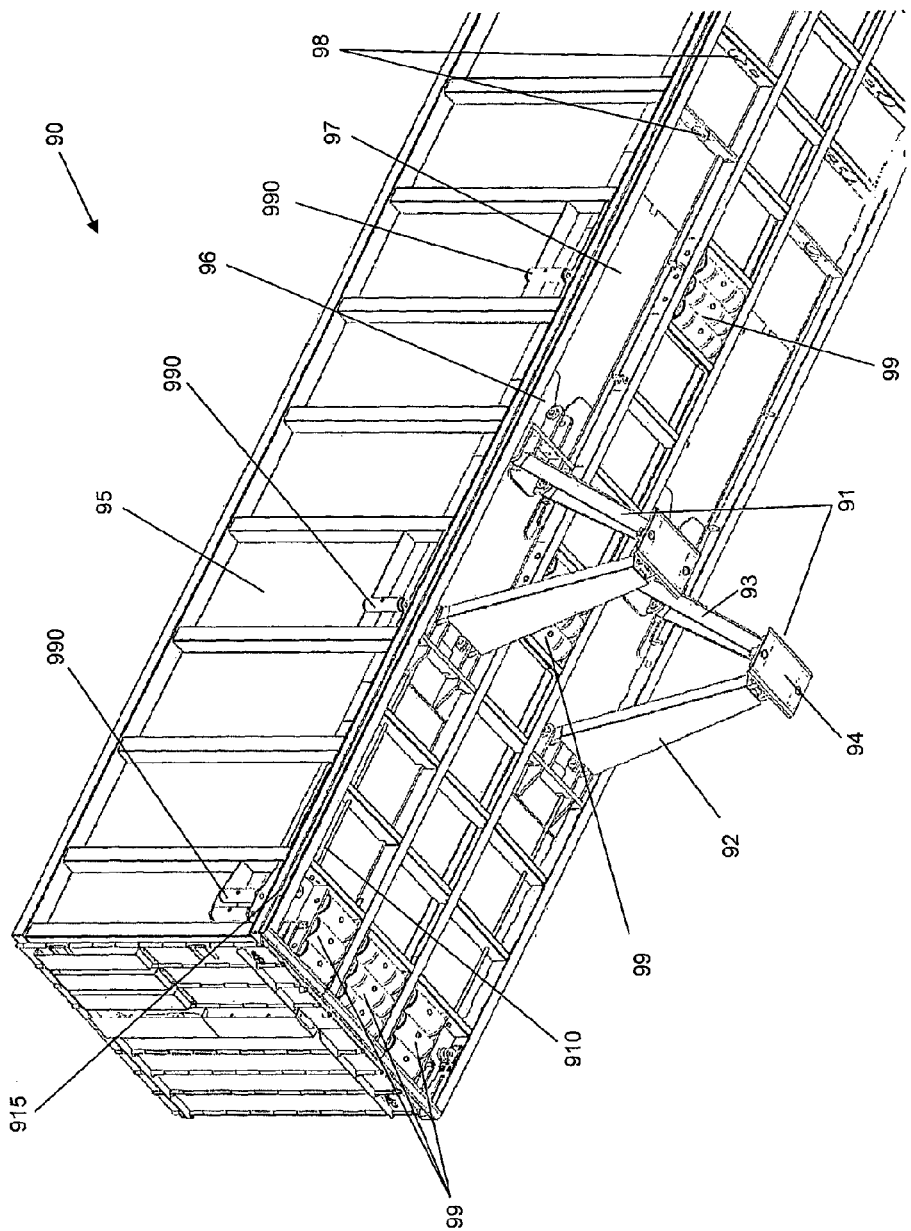
FIG. 9 is a bottom perspective view illustration of part of a container loader according to another embodiment of the invention.

FIG. 9 is a bottom perspective view illustration of part of a container loader 90 according to another embodiment of the invention. Container loader 90 is similar in many respects to the container loader described in relation to FIGS. 1-4 but has different foldable support means, which will now be described.

The support means of container loader 90 comprises two legs 91. Each leg comprises two struts 92 and 93 and a foot member 94. Struts 92 and 93 are pivotally attached at a first end to the foot member 94 and pivotally attached at a second end to the underside of bin 95. Strut 93, the strut furthest from the front door of bin 95, is attached to bin 95 by means of a sliding portion 96. Each sliding portion 96 is able to move longitudinally along the underside of bin 95 along cavity 97, thereby enabling each leg 91 to fold up under bin 95. Although not shown in FIG. 9, a hydraulic ram is preferably connected between each sliding portion 96 and the underside of the bin and positioned longitudinally along the underside of the bin, for example through holes 98, to actuate the folding up and down of legs 91.

The raising and lowering of legs 91 may be controlled in a number of ways. In a preferred embodiment, they are automatically raised and lowered according to the position of a container relative to the container loader. A container detector device, such as a proximity sensor or the like may be provided such that, when the container engulfs the bin by a predetermined amount sufficient to support the weight of the bin, the hydraulic ram is actuated to fold up the legs. Likewise, the container detector causes the legs to automatically fold down when the container moves forward along the bin past a predetermined point. Alternatively, the legs may be moved up and down by a manual control, or simply pushed up by the advancing container and allowed to fall back into position by the receding container.

The arrangement of the foldable support means shown in FIG. 9 may provide certain advantages over that shown in FIGS. 1-4. The position of sliding portion 96 can be varied in order to vary the height of the legs. This allows the container loader to move the bin up and down to cater for containers at different heights. Furthermore, the symmetrical arrangement of struts has been found to allow load cells to accurately indicate the load in bin 95 when load cells are positioned in foot members 94.

In some embodiments, load cells are also provided in the rear support means. In combination with load cells in the front support means, the weight of the bin and material inside the bin, as well as the distribution of this weight, can be determined. This knowledge can be used to ensure the bin is loaded in a desired way, for example to ensure the amount of material loaded in the bin does not exceed the maximum load that can be borne by either the container loader or the vehicle that will be carrying the material once it has been loaded into a container.

Referring again to FIG. 9, actuator arms 910 may operably connect each leg 91 to the projection 915 on the side of the bin that causes the attachment means on the material transfer member to release the container. When each leg 91 is in the folded (up or non-supporting) configuration, the respective actuator arm 910 causes the respective projection 915 to recede into the side of the bin. In this position, the projection cannot trigger the attachment means to release the container. Therefore, if a malfunction occurs and each leg is folded and unable to support the weight of bin 95, the container cannot be released. This prevents the vehicle bearing the container, which also bears the weight of bin 95 when the legs are folded up, from driving away and leaving the bin without support. However, when the legs are unfolded and able to support the weight of the bin, projection 915 projects out, thus being in position to trigger the release of the container. While not shown in FIG. 9, any suitable mechanism for operably linking actuator arm 910 with projection 915 in the way that has been described may be used, examples of which will be apparent to those of skill in the art.

Bin 95 of container loader 90 also comprises rolling means 99 at various locations on its underside. Rolling means 99 comprise rollers having their axes aligned transversely to bin 95, i.e. to promote movement longitudinally to the bin. Rolling means in the form of rollers 990 may also be provided on the sides of bin 95 with their axes arranged vertically. The rollers help the bin to slide relative to the bottom and sides of the container when the container reverses back into the container loader and pulls away from it, thus reducing damage to the bottom and sides of the container.

If the load of material to be transferred into the bin is particularly heavy, or if the vehicle bearing the container that pulls the material transfer member lacks power then it may be difficult for the vehicle to pull the load into the container. To resolve this, embodiments of the invention are provided which comprise a further actuation means or transfer mechanism for moving the material transfer member along the inside of the bin and hence transferring material into the container. The actuation means may assist the vehicle and/or container in moving the material transfer member. The actuation means may have a power source other than the vehicle on which the container is mounted.

Figure 10:
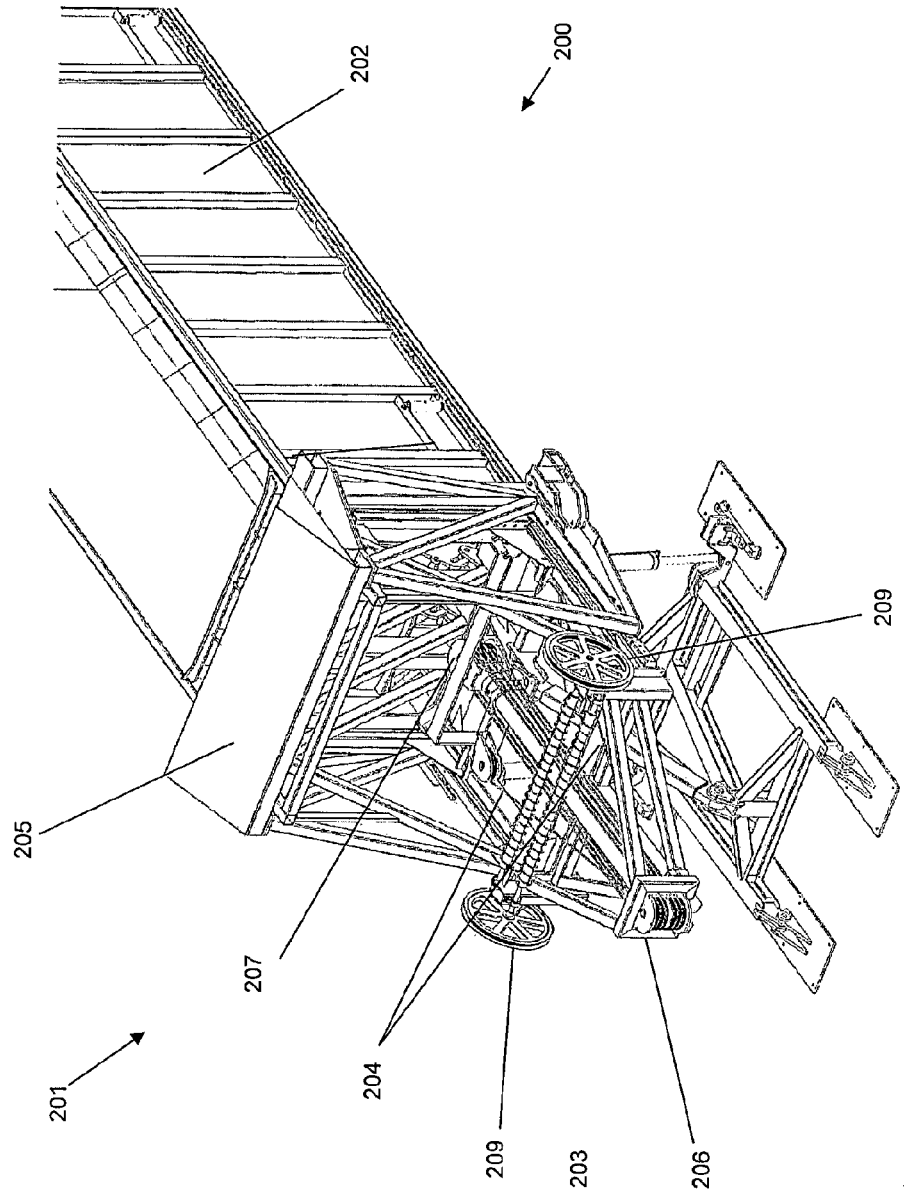
FIG. 10 is a rear isometric view illustration of a container loader according to another embodiment of the invention.

FIG. 10 is a rear isometric view illustration of part of a container loader 200 according to another embodiment of the invention. Container loader 200 comprises a pulling means in the form of an actuation means 201 which may assist, for example, a truck in loading material from bin 202 into a container.

Actuation means 201 comprises a linear actuator such as a hydraulic cylinder or ram 203. Two cables 204 are connected between the ram 203 and material transfer member 205. Cables 204 pass about two pulleys 206 and 207 and run along the side of bin 202 to the front of the container loader (i.e. the end where doors 208 are situated), pass around a pulley (not shown) at the front of bin 202 and then connect to material transfer member 205. The cables may, for example, be connected to the rig of material transfer member outside bin 202. The cables and pulley system are arranged in such a way that extension of the ram 203 causes cables 204 to pull material transfer member 205 forwards along bin 202. The cables preferably pass along channels close to the side of the bin, or enclosed channels along the bin, to reduce the chances of them snagging.

Cables 204 are preferably connected to the rig of material transfer member 205 by means of a boss or other fixing that allows the cables to pass through the material transfer member and only exert a pulling force in the material transfer member when the boss abuts it. Therefore, material transfer member 205 is free to travel forward faster than actuation means 201 pulls it.

To ensure there is no slack in the cable if the material transfer member 205 travels forward faster than actuation means 201 pulls it, a tensioning means may be provided. The lack of slack helps the cable to avoid snagging in any of the container loader mechanisms. In the embodiment of FIG. 10, the tensioning means comprises further lengths of cables, each attached to the ends of cables 204. The further lengths of cables are each wound around one of reels 209, which operate to take up any slack in the cables and hold the cables in tension. Any suitable pre-tensioning system may be used in alternative embodiments of the invention.

Cables 204 are preferably strong since they may need to pull significant weight of material sat in front of the material transfer member. In one example, 11 mm wire was found to be capable of pulling 8 tons of material in a container loader. The further lengths of cable in the tensioning system do not need to be as thick since they are non-load bearing. In the aforementioned example, 3 mm wire was adequate for holding the thicker, load-bearing cables under tension.

In use, actuation means 201 is used to supplement the power of a vehicle on which a container is loaded if the vehicle needs assistance overcoming the initial friction of material in bin 202, if the material is a particularly heavy load or if the vehicle lacks sufficient power to move material transfer member 205 itself. In such situations or as a precaution even if the vehicle was thought to be able to cope on its own, the actuation means is started at the time the vehicle starts to move forward. An indicator may be provided to the driver of the vehicle to tell them when to drive forward, for example a green light signal.

Once activated, the actuation mechanism pulls the cables through the pulley system at a steady rate. If the vehicle is struggling to pull the material transfer member, the bosses on cables 204 will engage with the material transfer member and the actuation mechanism therefore assists in pulling the material transfer member forward. The actuation mechanism may continue to pull the material transfer member forwards. But at any point, the vehicle may gain enough power to pull the material transfer member forwards faster than the actuation mechanism. In which case, it is free to pull the material transfer member forwards away from the boss on the cables and the tensioning system ensures the cables do not go slack. Similarly, at any point the vehicle may begin to struggle with the load. In this case the actuation mechanism will "catch up" with the material transfer member so that the bosses on the cables re-engage with the material transfer member and the actuation mechanism again provides pulling assistance.

Figure 11:
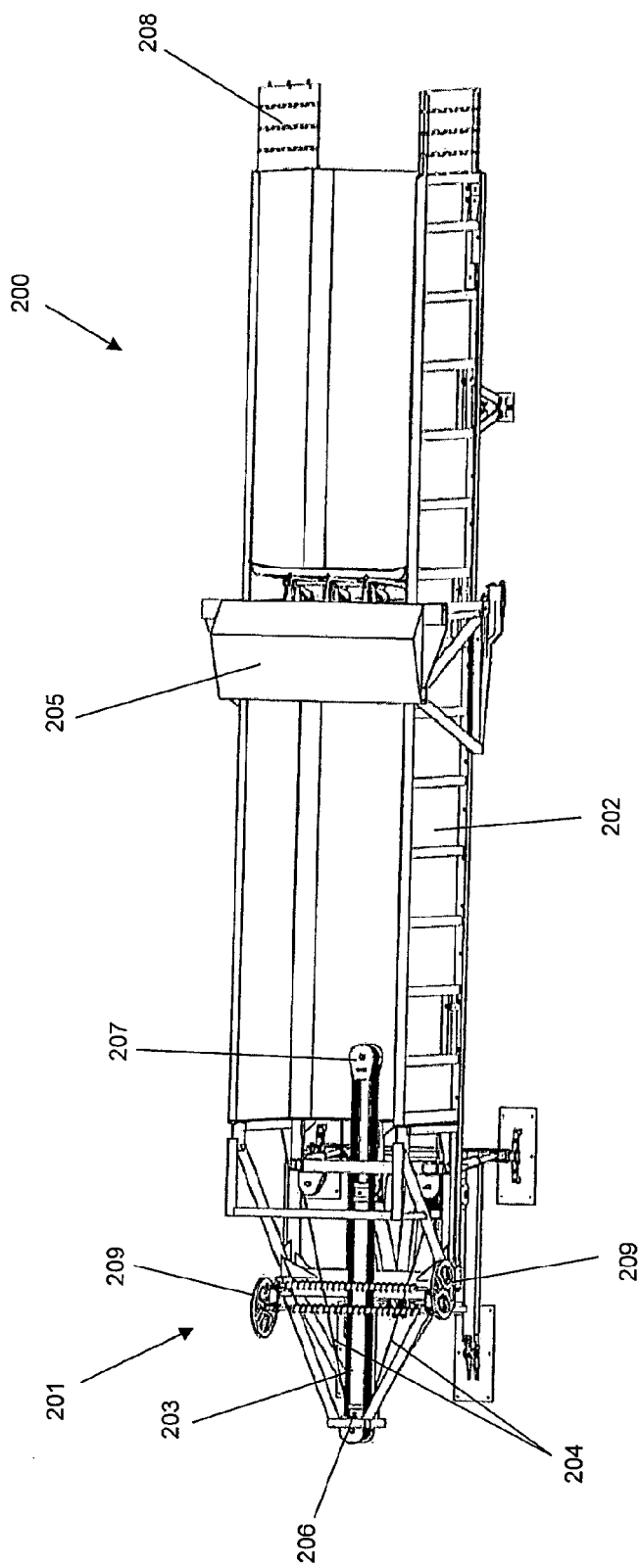
FIG. 11 is an isometric view illustration of the container loader of FIG. 10 shown in an extended position.

FIG. 11 is an isometric view illustration of the container loader 200 of FIG. 10 shown in an extended position. In this figure, ram 203 can be clearly seen with pulleys 206 and 207 on either end. The use of the pulleys is advantageous because ram 203 only extends a small amount for a larger amount of retraction of the cables 204, thus avoiding the need for a ram that extends the length of the bin.

In one embodiment of the invention, a container loader provided with an actuation means such has been described is able to load a container using only the power of the actuation means without the power of the vehicle bearing the container at all. For example, a neutral gear in the vehicle bearing the container may be selected prior to activation of the actuation mechanism. As the material transfer member moves forward under the power of the actuation mechanism, material is loaded from the bin into the container, which has the effect of gradually pushing the vehicle bearing the container forwards as material is transferred into the container.

Above has been described one particularly suitable embodiment of an actuation mechanism for moving the material transfer member along the bin. In other embodiments, other mechanisms may be used, for example incorporating motors, gears, chains and the like.

Figure 12:
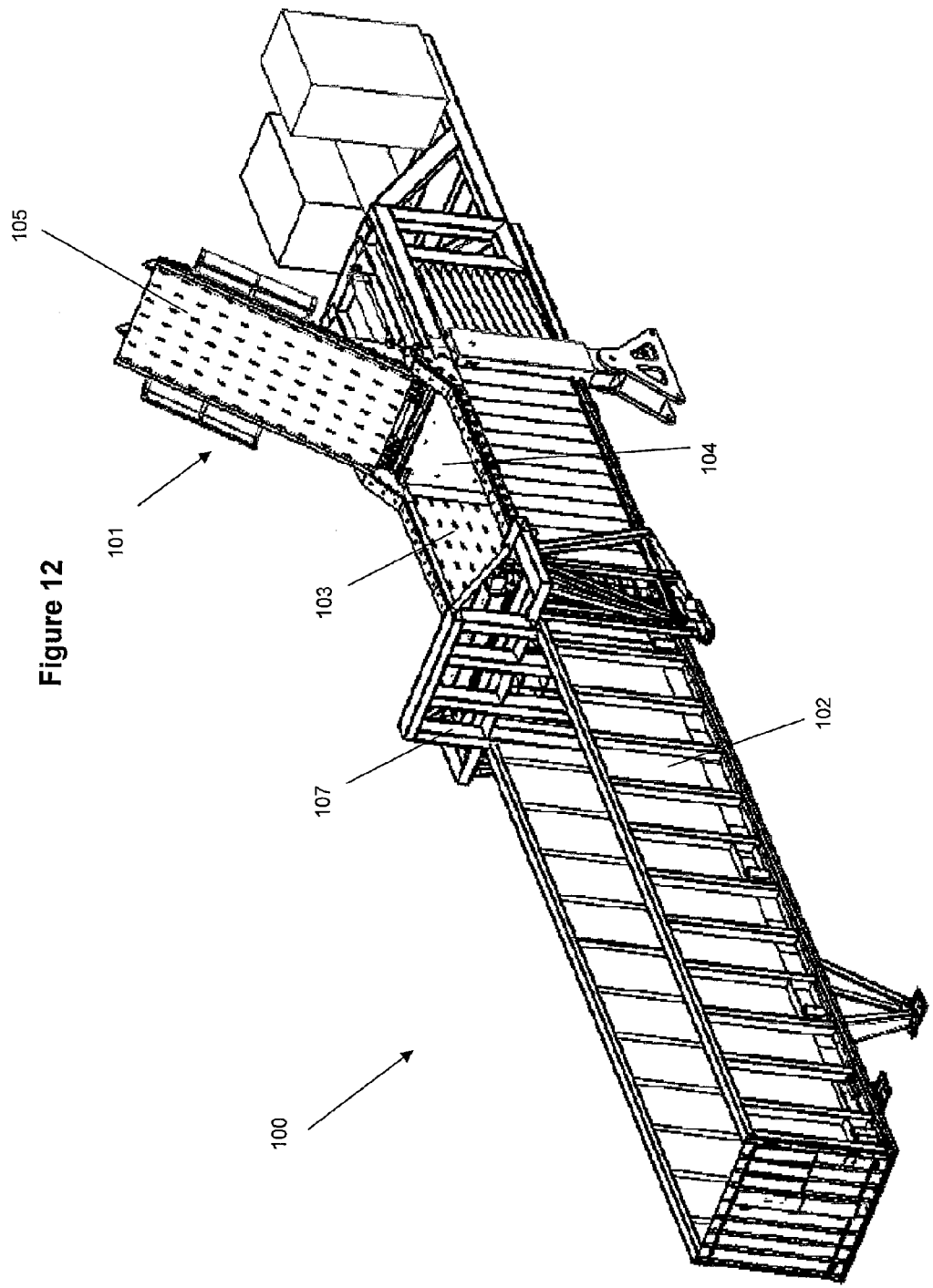
FIG. 12 is a perspective view illustration of a container loader according to another embodiment of the invention.
Figure 13:
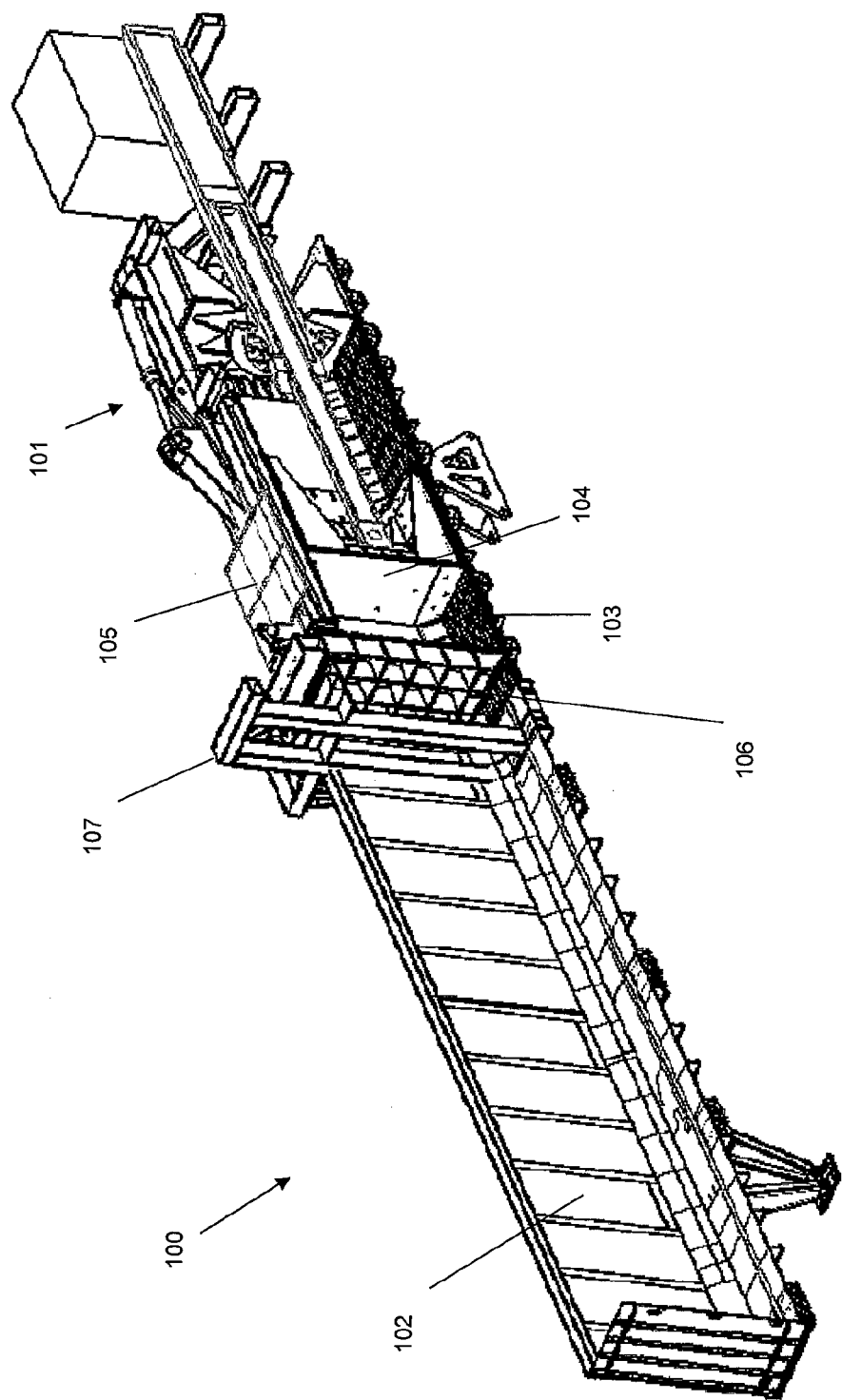
FIG. 13 is a lengthwise cross-sectional perspective view illustration of the container loader shown in FIG. 12.
Figure 14:
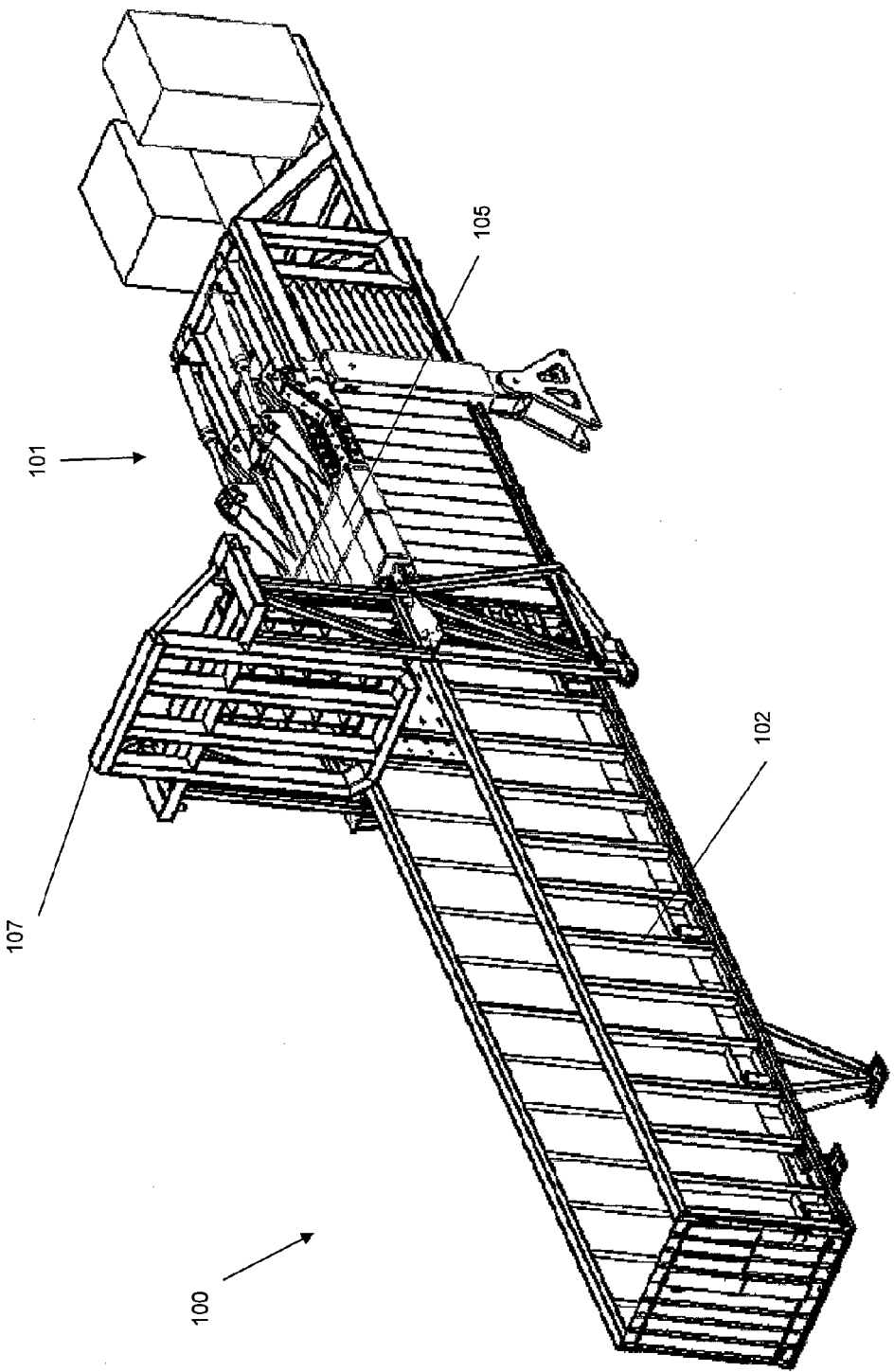
FIG. 14 is a perspective view illustration of the container loader shown in FIG. 12.
Figure 15:
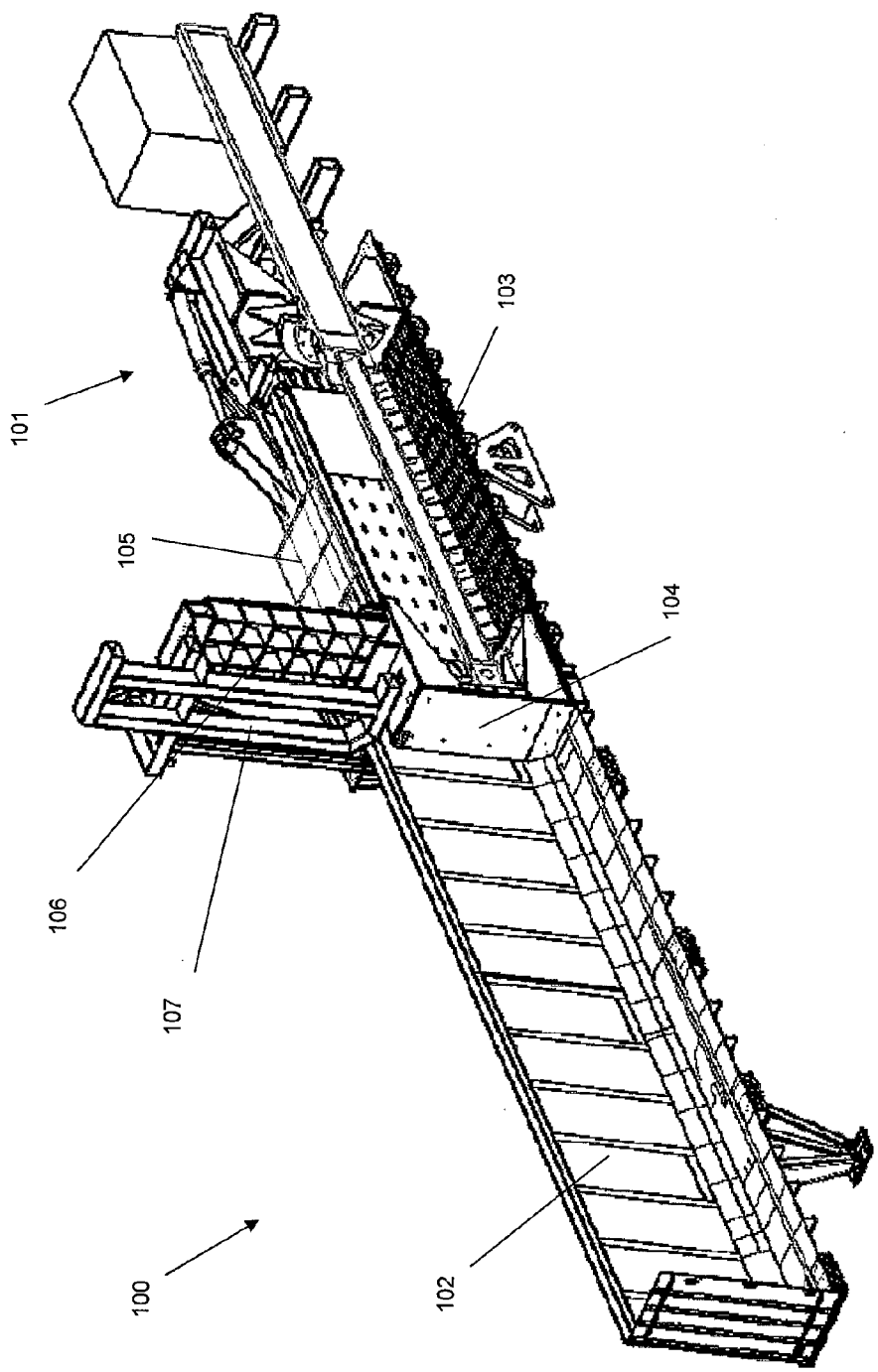
FIG. 15 is a lengthwise cross-sectional perspective view illustration of the container loader shown in FIG. 12.

FIGS. 12 to 15 are perspective view illustrations of a container loader 100 according to another embodiment of the invention. FIGS. 13 and 15 show a lengthwise cross-sectional view of container loader 100.

Container loader 100 is similar in many respects to the container loaders discussed in relation to other embodiments of the invention above. However, container loader 100 further comprises a material compactor apparatus 101. Material compactors are well known in the scrap industry and many different types of compactors may be adapted to be used with a container loader according to the invention. One example will now be discussed with reference to FIGS. 12 to 15.

Material compactor 101 is attached to bin 102 of container loader 100. For example, the compactor apparatus may extend rearwards from bin 102. Compactor 101 comprises a chamber 103 and compacting ram 104. Compacting ram 104 comprises a front compacting plate and an extendable ram. In use, material to be compacted is placed in chamber 103, for example through the open top of chamber 103 when door 105 is open, as shown in FIG. 12. Door 105 is then closed and compacting ram 104 actuated. Compacting ram 104 extends across chamber 103, squashing the material inside against wall 106, as shown in FIG. 13.

Once compacted, material is then transferred into bin 102 of container loader 100. Although any transfer mechanism can be used, in the embodiment shown, the transfer is achieved by using compactor ram 104. Using the compactor ram for this purpose is a convenient use of the ram and avoids the need for a separate transfer mechanism. Wall 106 and material transfer member 107 are operable to be raised out of bin 102 using any suitable lifting mechanism. When lifted, as shown in FIG. 12, chamber 103 is openly joined to the inside of bin 102. Material can therefore be transferred into bin 102 by further extension of compacting ram 104, as shown in FIG. 15.

Depending on the size of the material compactor, the steps of compacting material in chamber 103 and transferring it into the container loader bin may occur several times until the requirement amount of material has been transferred into the bin. To repeat the steps described above, the compacting ram is first contracted and material transfer member 107 and wall 106 are lowered, enabling more material to be compacted. Once bin 102 is loaded to the required level, the container loader is operated as has been described above in order to transfer the material into a container.

In other embodiments of the invention, the compactor apparatus may be detachable from the container loader bin. For example, the compactor may be used to compact material in one location before being transported and connected to the container loader bin, whereby material may be transferred into the bin for loading into a container.

The invention has been described in relation to its use for loading a shipping container. Any type of container may be loaded by the container loader according to the invention and the invention is not limited to its use for loading any particular type of container. In another example, the container loader may be used to load material into transport tub, bathtub and Gondola trailers, for example for loading rubbish into trucks from a waste collection depot. A truck used with a container loader in such a way may comprise a means for connecting to the material transfer member of the container loader towards the rear of the truck.

In alternative embodiments of the invention, the walls and/or bottom of the bin may be in the form of a mesh, cage or similar. This may be advantageous where a lighter container loader is required, provided the walls and/or bottom have sufficient strength to hold the required material therein, the material cannot pass through the gaps in the walls and/or bottom and is not liable to snag when sliding along the walls and/or bottom.

The inner surfaces of bin 11 may comprise means for reducing the friction or drag on material sliding along them. For example, the inner sides of the bin walls and/or the upper surface of the bin bottom may comprise runners, rollers or any suitable means for reducing friction. In one embodiment, the surfaces are formed from or coated with a friction reducing substance or a lubricant, such as oil. The advantage of reducing the friction on material sliding along bin 11 is that the force required to cause the material transfer member to move forward is reduced. This reduces the demand on the vehicle or machine moving the container and material transfer member forwards, meaning smaller engines or less power may be sufficient to operate the container loader.

While the material transfer member has been preferably described as comprising a vertical plate to contact the material in the bin, in other embodiments a different shaped member may be provided. For example, the plate may comprise a concave or wedge-shaped bottom section to slightly lift the material being transferred, thus tending to reduce friction with the bottom of the bin and reduce the force needed to pull the material into the container. In other embodiments, the face of the plate may be convex.

It will be understood that the invention is not limited to the form of attachment means used to connect the material transfer member with the container. For example, fastening arms may be provided in a different position to that described in relation to FIGS. 1-4 or additional fastening arms may be provided. A different form of attachment means may also be used, such as clasps, catches, bolts, fasteners and the like.

Alternatively, the attachment means may comprise a fastener receiving means where a fastener, clamp or the like is provided on the container or vehicle bearing the container and this is attached to a portion of the material transfer member adapted to receive said fastener or the like.

In a further alternative, the container may be indirectly coupled to the material transfer member, for example using an intermediate device or bracket connected in between the container and the material transfer member.

In the embodiment described with relation to FIGS. 1-4, an attachment means is used to connect the material transfer member directly to the container. In another embodiment, the material transfer member may be connected to a vehicle carrying a container, such as a truck or lorry. This may be advantageous where the container is not securely mounted on the vehicle and connection to the material transfer member may risk loosening the container from the vehicle.

Alternative embodiments of the invention may comprise different orientation adjustment means from that described in relation to FIGS. 1-4. For example, a different arrangement of pistons may be provided and the pistons may operate by means other than hydraulics, for example pneumatics. Still further, any mechanism by which the orientation and/or position of the bin can be altered is included within the scope of the invention.

In one embodiment of the invention, the doors of the bin open manually or automatically as material is loaded into the container out of the bin. In a still further embodiment, the doors may open gradually as material is emptied from the bin, which may prevent spilling for some types of material. The plurality of sections of the door shown in the Figures may open one section at a time. It will be apparent to those of skill in the art what form of doors actuation mechanism may be connected to the material transfer member to close as the material transfer member nears the front end of the bin.

For example, as the material transfer member is pulled by the vehicle and the container slides relative to the bin, material is pushed against the doors. In one embodiment in which the door comprises foldable sections, material pushing against the door allows the door to fold one section at a time for maximum area filling of material. Each section will fold towards the corner of the container until the doors are flat against the side of the container.

In one embodiment, doors 18 are adapted to be in communication with a component on the inside end of the container being loaded such that the doors are only able to open if the doors are in close proximity to the inside end face of the loading container. This ensures that the doors are not able to open unintentionally during operation of the bin moving into the container. Suitable mechanisms for triggering the door release when in close proximity to the end of the container will be apparent to those of skill in the art.

In an alternative embodiment of the invention, the container loader comprises a cantilever support means for the bin. That is, the support means is located proximate to the end of the bin furthest from the doors. Although this means there is no need to have the central legs that fold away as the container pushes against them, the footprint of the container loader is likely to be greatly increased because of the required size and mass of the cantilever support. Furthermore, the moment exerted on the container loader when a large mass of material is loaded into the bin may cause the container loader to suffer severe stresses.

In some embodiments, the container loader may be adapted to be able to be towed. This may be advantageous for transporting the container loader and/or positioning the loader at a given site. For example, the loader may comprise an axle and front wheel that are preferably arranged so that they do not interfere with the normal operation of the loader, for example they are able to be removed. In these embodiments, it may be advantageous if the loader has dimensions below any relevant restrictions for road-going vehicles in any particular country.

Container Unloading

While the container loader has been described chiefly in relation to its use for loading a container, it will be appreciated that the container loader is also able to be used for unloading.

To unload, a loaded container may be backed towards the container loader. Depending on the material to be unloaded from the container, it may be possible to continue backing the container into the loader such that the bin is inserted inside the container and scoops up the material in the container. This may be possible if the material is generally light and/or granular.

Alternatively, the container may merely be positioned adjacent to the bin of the container loader and material may be transferred by any means into the bin. However, this may be damaging to the base of the container if material is slid along its bottom.

In another embodiment, a container or vehicle may be fitted with a device according to the invention. The device may be built into the container in such a way that it may be used for unloading material from the container, for example unloading material out of the container on to the ground, a feed hopper or any type of container. In this embodiment, a material transfer member mounted in the container is operable to be moved forward by a movement means to transfer material out of the container. The material transfer member may be connectable to a movement means such as another vehicle or any machine operable to move the material transfer member forward, for example by pulling.

In this embodiment, it may be necessary to narrow any components of the device extending laterally from the container to ensure compliance with road safety requirements when the container is carried by a road going vehicle. If necessary, parts of the material transfer member and/or attachment means may be able to fold back against the side of the vehicle to reduce its width.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. A material loader for loading material into a freight container borne by a vehicle, the material loader comprising:
   a bin having an open or openable first end, the bin, in use, being able to be positioned such that the first end extends into the freight container;
   a material transfer member having a part thereof operable to move along the inside of the bin in a longitudinal direction towards the first end; and
   one or more connectors adapted to connect the material transfer member to the freight container and/or the vehicle so that:
   movement of the material transfer member in the longitudinal direction towards the first end causes movement of the freight container and/or the vehicle in the longitudinal direction; and
   movement of the freight container and/or the vehicle in the longitudinal direction causes movement of the material transfer member in the longitudinal direction towards the first end,
   wherein the material loader is configured such that, in use, when the material transfer member is pulled in the longitudinal direction towards the first end, material in the bin is loaded into the freight container;
   wherein the material loader further comprises a release mechanism adapted to release the one or more connectors when the material transfer member reaches a point proximate the first end of the bin; and
   wherein the release mechanism is configured to only release the one or more connectors when one or more foldable legs of the material loader are not in a folded configuration.

2. A material loader as claimed in claim 1, wherein the material transfer member is adapted to be coupled to the vehicle bearing the freight container such that, in use, forward movement of the vehicle relative to the bin in the longitudinal direction causes the material transfer member to move in the longitudinal direction towards the first end.

3. A material loader as claimed in claim 1, wherein the material transfer member further comprises a rig connected to a top portion of the material transfer member, the rig being operable to move along outside the bin.

4. A material loader as claimed in claim 1, wherein the material loader comprises a bin door or doors at the first end of the bin and a door(s) actuation mechanism adapted to automatically close the bin door(s) following loading of the freight container.

5. A material loader as claimed in claim 1, wherein the material loader comprises an orientation adjustment assembly.

6. A material loader as claimed in claim 5, wherein the orientation adjustment assembly comprises one or more hydraulic pistons operable to tilt and/or move the bin in at least one direction.

7. A material loader as claimed in claim 1, wherein the material loader comprises one or more legs on an underside of the bin, each leg comprising two struts and a foot member, each strut being pivotably attached at a first end to the foot member and pivotably attached at a second end to the underside of the bin, wherein one of the struts is pivotably attached to the underside of the bin by means of a sliding portion in sliding engagement with the underside of the bin.

8. A material loader as claimed in claim 1, wherein each of the one or more connectors comprises one or more triggers for attaching the material transfer member to the freight container and/or a vehicle when the freight container and/or vehicle triggers the one or more triggers.

9. A material loader as claimed in claim 1, wherein the one or more connectors are adapted to connect to a corner casting block of the freight container.

10. A material loader as claimed in claim 8, wherein each trigger comprises an extending member which is configured to be pushed upon correct positioning of the freight container with respect to the material loader, the extending member when pushed allowing a fastening arm to pivot into engagement with the freight container and/or vehicle.

11. A material loader as claimed in claim 1, wherein the material loader comprises at least one cable connected between the material transfer member and an actuator such that, when actuated, the actuator pulls the material transfer member by means of the cable.

12. A material loader as claimed in claim 1, wherein the material loader comprises a material compactor apparatus for compacting the material prior to being loaded in the bin.

13. A material loader as claimed in claim 12, wherein the material transfer member is able to be moved to allow the compacted material to be moved from the compactor into the bin.

14. A material loader for loading material into a freight container borne by a vehicle, the material loader comprising:
   a bin having an open or openable first end, the bin, in use, being able to be positioned such that the first end extends into the freight container;
   a material transfer member having a part thereof operable to move along the inside of the bin towards the first end;
   one or more foldable supports on an underside of the bin adapted to support at least part of the weight of the material loader in an unfolded configuration and adapted to allow movement of the freight container relative to the bin in a folded configuration;
   one or more connectors adapted to attach the material loader to the freight container and/or the vehicle, the freight container/vehicle supporting the weight of the first end of the bin when the one or more foldable supports are in the folded configuration; and
   a release mechanism adapted to release the one or more connectors when the material transfer member reaches a point proximate the first end of the bin,
   wherein the release mechanism is configured to only release the one or more connectors when the one or more foldable supports are in the unfolded configuration.

* * * * *